(12) United States Patent
Look et al.

(10) Patent No.: US 11,373,133 B2
(45) Date of Patent: Jun. 28, 2022

(54) ROBOT SERVICE PLATFORM

(71) Applicant: Autodesk, Inc., San Rafael, CA (US)

(72) Inventors: Douglas Look, San Francisco, CA (US); James Awe, Santa Rosa, CA (US); Mark Thomas Davis, Mill Valley, CA (US); Negar Arabani, Mill Valley, CA (US); Patricia Anne Vrobel, Portland, OR (US)

(73) Assignee: Autodesk, Inc., San Rafael, CA (US)

( * ) Notice: Subject to any disclaimer, the term of this patent is extended or adjusted under 35 U.S.C. 154(b) by 426 days.

(21) Appl. No.: 16/506,854

(22) Filed: Jul. 9, 2019

(65) Prior Publication Data
US 2019/0378077 A1  Dec. 12, 2019

Related U.S. Application Data

(62) Division of application No. 14/943,441, filed on Nov. 17, 2015, now Pat. No. 10,430,744.

(60) Provisional application No. 62/208,285, filed on Aug. 21, 2015.

(51) Int. Cl.
*B25J 9/16* (2006.01)
*G06Q 10/06* (2012.01)
*B25J 11/00* (2006.01)

(52) U.S. Cl.
CPC ...... *G06Q 10/06398* (2013.01); *B25J 9/1661* (2013.01); *B25J 11/008* (2013.01); *G06Q 10/0631* (2013.01); *G06Q 10/06313* (2013.01); *G06Q 10/063114* (2013.01); *G06Q 10/063118* (2013.01); *G05B 2219/40411* (2013.01); *Y10S 901/08* (2013.01)

(58) Field of Classification Search
CPC ........ G06Q 10/06398; G06Q 10/0631; G06Q 10/063114; G06Q 10/063118; G06Q 10/06313; B25J 9/1661; B25J 11/008; G05B 2219/40411; G05B 2219/39146; G05B 2219/39117; G05B 19/41815; G05B 2219/39117; Y10S 901/08
See application file for complete search history.

(56) References Cited

U.S. PATENT DOCUMENTS 6,636,781 B1  10/2003  Shen et al.
6,658,325 B2  12/2003  Zweig
(Continued)

Primary Examiner — Robert T Nguyen
(74) Attorney, Agent, or Firm — Fish & Richardson P.C.

(57) ABSTRACT

Methods, systems, and apparatus, including computer programs encoded on a computer storage medium, to share information in a community of robots and users to perform tasks. In one aspect, a method includes registering a plurality of robots in a system including creating for each robot a robot profile; publishing the robot profile; collecting operational data related to performance of tasks, the operational data including situational awareness information from at least a first of the plurality of registered robots; evaluating the collected operational data including performing statistical analysis, modeling, and extrapolation using the collected operational data; and in response to a request to transfer relevant data to at least a second of the plurality of registered robots, determining relevant data from the evaluated collected operational data, the relevant data including at least a portion of the situational awareness information; and sending the relevant data to at least the second registered robot.

21 Claims, 6 Drawing Sheets

(56) References Cited

U.S. PATENT DOCUMENTS

| | | |
|---|---|---|
| 7,024,461 B1 | 4/2006 | Janning et al. |
| 8,452,777 B2 | 5/2013 | Rose |
| 8,532,820 B1 | 9/2013 | Sampath |
| 8,555,173 B2 | 10/2013 | Kast |
| 8,631,015 B2 | 1/2014 | Rose et al. |
| 8,725,673 B2 | 5/2014 | Kast et al. |
| 8,826,303 B2 | 9/2014 | Rose |
| 8,930,022 B1 | 1/2015 | Kuffner, Jr. et al. |
| 9,008,839 B1 | 4/2015 | Kuffner, Jr. et al. |
| 9,031,692 B2 | 5/2015 | Zhu |
| 9,246,573 B1* | 1/2016 | Gettings ............... H04B 7/155 |
| 9,446,511 B2* | 9/2016 | Kuffner, Jr. ........... B25J 9/0084 |
| 2005/0131582 A1 | 6/2005 | Kazi et al. |
| 2007/0244610 A1 | 10/2007 | Ozick et al. |
| 2008/0309665 A1 | 12/2008 | Gregory, II et al. |
| 2013/0261867 A1 | 10/2013 | Burnett et al. |
| 2015/0228134 A1 | 8/2015 | Tehranchi et al. |
| 2015/0262102 A1* | 9/2015 | Tann ............... G06Q 10/06311 |
| | | 700/248 |
| 2015/0336270 A1 | 11/2015 | Storr |
| 2016/0132059 A1* | 5/2016 | Mason ................ G05D 1/0291 |
| | | 701/28 |
| 2016/0196706 A1 | 7/2016 | Tehranchi et al. |
| 2017/0050321 A1 | 2/2017 | Look et al. |
| 2017/0080566 A1 | 3/2017 | Stubbs et al. |
| 2018/0253108 A1* | 9/2018 | Heinla .................... G06T 7/579 |
| 2019/0310655 A1* | 10/2019 | Voorhies ................ B66F 9/063 |
| 2021/0284491 A1* | 9/2021 | Zhang .................. B66B 1/3461 |
| 2021/0373576 A1* | 12/2021 | Sohn ..................... B25J 9/1669 |

\* cited by examiner

ROBOT SERVICE PLATFORM

CROSS-REFERENCE TO RELATED APPLICATIONS

This is a divisional application of U.S. patent application Ser. No. 14/943,441, entitled "ROBOT SERVICE PLATFORM", filed Nov. 17, 2015, and issued as U.S. Pat. No. 10,430,744 on Oct. 1, 2019, which claims the benefit under 35 U.S.C. § 119(e) of U.S. Patent Application No. 62/208,285, entitled "ROBOT SERVICE PLATFORM", filed Aug. 21, 2015. The disclosures of the above applications are incorporated by reference in their entireties.

BACKGROUND

This specification relates to sharing information in a networked community to facilitate collaboration among members of the community.

Social collaboration networks contain a vast amount of content, e.g., user profile information, common interests and goals, and various associations between the users and the community. The collaborative environment can be used for a wide range of activities, e.g., crowdsourcing or crowdfunding. Crowdsourcing can involve the division of labor for tedious tasks and the use of crowd-based outsourcing to complete tasks, and crowdfunding involves the funding of a project through monetary contributions from a community of individuals.

SUMMARY

This specification includes technologies relating to sharing information in a community of robots and users to perform tasks. In general, one or more aspects of the subject matter described in this document can be embodied in a method that includes registering, a plurality of robots in a system including creating for each robot of the plurality of robots a robot profile; publishing the robot profile of each registered robot of the plurality of registered robots to enable discovery of each registered robot by other registered robots in the system or by users of the system including owners of registered robots in the system; providing an application programming interface to the plurality of registered robots in the system; providing a user interface to users of the system; receiving a service request; determining that a user or registered robot is qualified to obtain service information in response to the service request; determining, responsive to the user or registered robot being qualified, the service information for the service request based on the published robot profiles; selecting one or more registered robots to receive the service information; and sending the service information to the one or more selected registered robots. Other embodiments of this aspect include corresponding systems, apparatus, and computer program products.

These and other embodiments can optionally include one or more of the following features. The method can include determining a plurality of tasks associated with the service request and assigning the plurality of tasks among the one or more selected registered robots based on the published robot profiles. The assigning can include identifying a particular registered robot from the plurality of registered robots to perform a particular task of the plurality of tasks based on (i) capabilities of the particular registered robot, (ii) schedule of availability of the particular registered robot, and (iii) tasking of the particular registered robot; and scheduling the particular registered robot to perform the first task including (i) updating the robot profile of the particular registered robot and (ii) communicating the first task and first time to complete the particular task to the particular registered robot. The service information can include information describing the plurality of tasks assigned to the one or more selected registered robots.

Moreover, registering the plurality of robots can include discovering robots or owners of unregistered robots in a locale based on operations of a respective robot; sending an invitation to the discovered robots or owners of unregistered robots; and receiving a response that indicates acceptance of the invitation from the discovered robots or owners of unregistered robots.

The service request can be a request to link a registered robot to another registered robot in the system, or the service request can be a request to monitor or analyze performance of registered robots.

The method can include collecting operational data related to performance and results of performed tasks, status information, health information, and currently assigned tasks from each of the registered robots; and evaluating the collected operational data including performing statistical analysis, modeling, and extrapolation using the collected operational data. The service request can be a request to transfer relevant data to one of the one or more selected registered robots, and sending the service information to a selected robot can include determining relevant data from the evaluated collected operational data and sending the relevant data to the selected registered robot.

The interface to the users of the system can include a query box or user interface elements. The robot profile can include capabilities of the robot, schedule of availability of the robot, performance ratings of specified tasks, and tasks assigned to a given robot. The selecting of one or more registered robots to receive the service information can include determining capabilities and schedule of availability of each of the one or more registered robots; determining when each task of the plurality of tasks is to be performed in a workflow; and identifying the one or more registered robots with the capabilities to perform the task and availability to perform the task at a time defined by the workflow. The system can be decentralized.

In general, in another aspect, the subject matter described in this document can be embodied in a system that includes a plurality of registered robots, each registered robot of the plurality of registered robots having a robot profile that is published to enable discovery by other registered robots in the system or by users of the system; and one or more computers and one or more storage devices storing instructions that are operable, when executed by the one or more computers, to cause the one or more computers to perform operations including receiving a service request from a requestor, wherein the requestor is a user of the system or a registered robot of the plurality of registered robots; determining that the requestor is qualified to obtain service information; in response to determining that the requestor is qualified, determining the service information to send to one or more registered robots that are selected from the plurality of registered robots based on the published robot profiles; and sending the service information to the one or more registered robots.

Various implementations of the subject matter described in this specification can be implemented to realize one or more of the following advantages. A community of users and robots can collaborate to perform service requests that no single user or robot can complete (either at all or as efficiently) on their own. The tasks included in the service request can be divided among different robots that each have a different set of capabilities and can be performed either sequentially or concurrently. For example, a first robot that can wash clothes, a second robot that can deliver packages, and a third robot that can iron can collaborate to pick-up clothes from a user's residence, wash the clothes, iron the clothes, and then return the clothes to the user's residence. Each robot by itself is not able to clean the user's clothes, but by working collaboratively, the robots are able to clean the user's clothes. The community can collaborate to perform the service request in parallel. For example, if the service request is to dispense material into packaging, two robots that can dispense material can work together to dispense the material in less time than if one of the robots worked alone. Moreover, the community can aggregate the collective intelligence of the community and provide relevant data to a particular member, e.g., to provide situational awareness or to perform decision analysis. For example, the community of robots can each provide different types of sensor data that can be aggregated and downloaded to a particular robot, which can use the aggregated data to make decisions, such as the most efficient route to travel.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
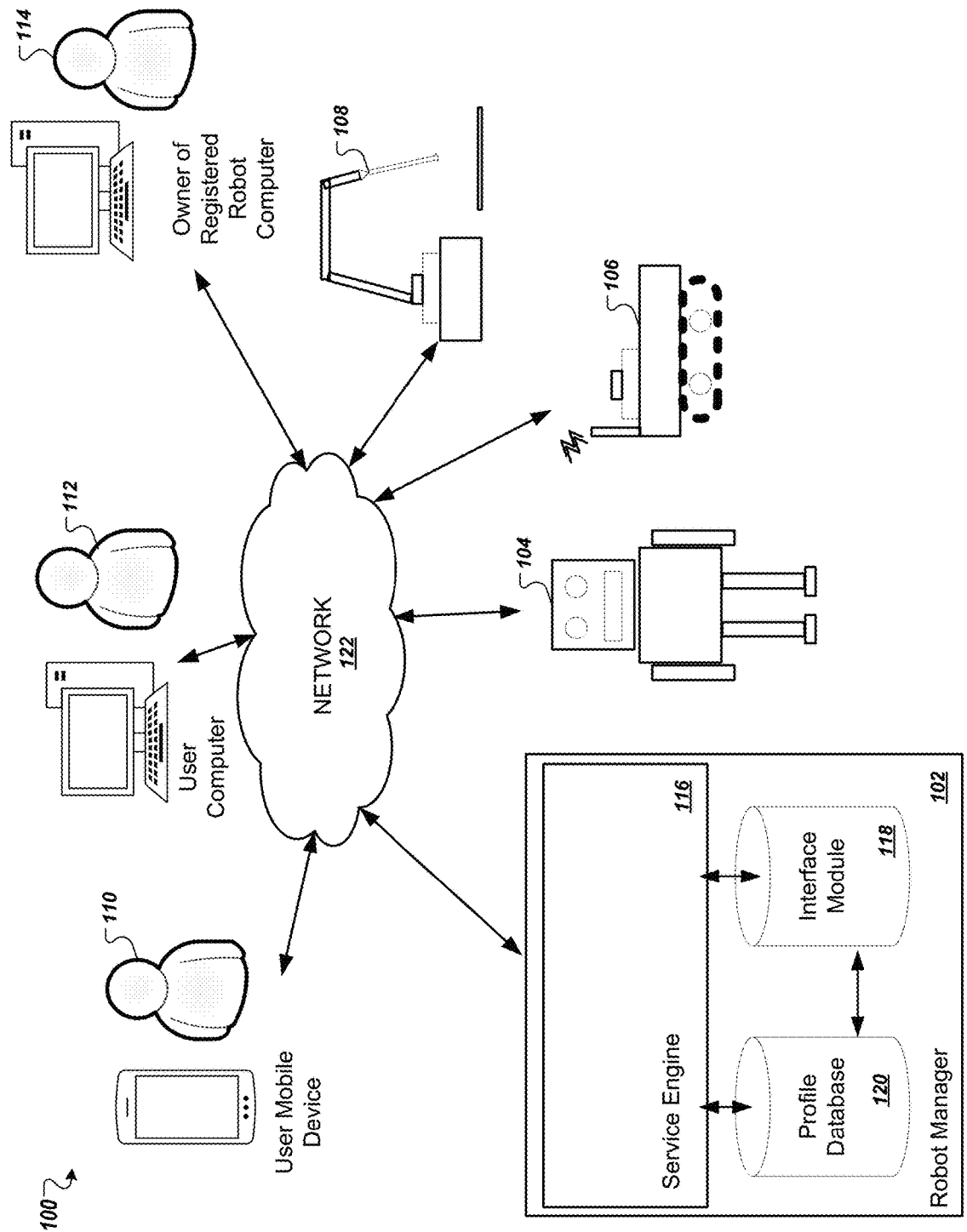
FIG. 1A shows an example robot management system.

FIG. 1A shows an example robot management system 100. The robot management system 100 is an example of a system implemented as one or more computer programs on one or more computers in one or more locations, in which the systems, components, and techniques described below, are implemented.

The robot management system 100 includes a robot manager 102 that manages a community of robots, e.g., robots 104-108 and users 110-114. The management of the community of robots and users includes processing service requests from multiple users, e.g., users 110-114 on user devices, e.g., personal computer, tablet, mobile device, or smartphone, and multiple robots, e.g., robots 104-108. The robot management system 100 can be centralized or decentralized. A centralized robot management system has a central server that executes the robot manager 102. A decentralized robot management system executes the functions of the robot manager 102 using robots, e.g., robots 104-108, in the system. For example, robot 104 can publish its robot profile to robot 106 and robot 108, and when required, send a service request to robots 106 and 108 to complete the service request. A robot can be stationary or mobile, e.g., leg-based or wheel-based. A robot can include one or more sensors. The sensors, for example, can track the location of the robot using a satellite navigation system, such as the Global Positioning System (GPS), wireless networks, or cellular networks. A user can be an owner of a registered robot or a user of the system.

Figure 1B:
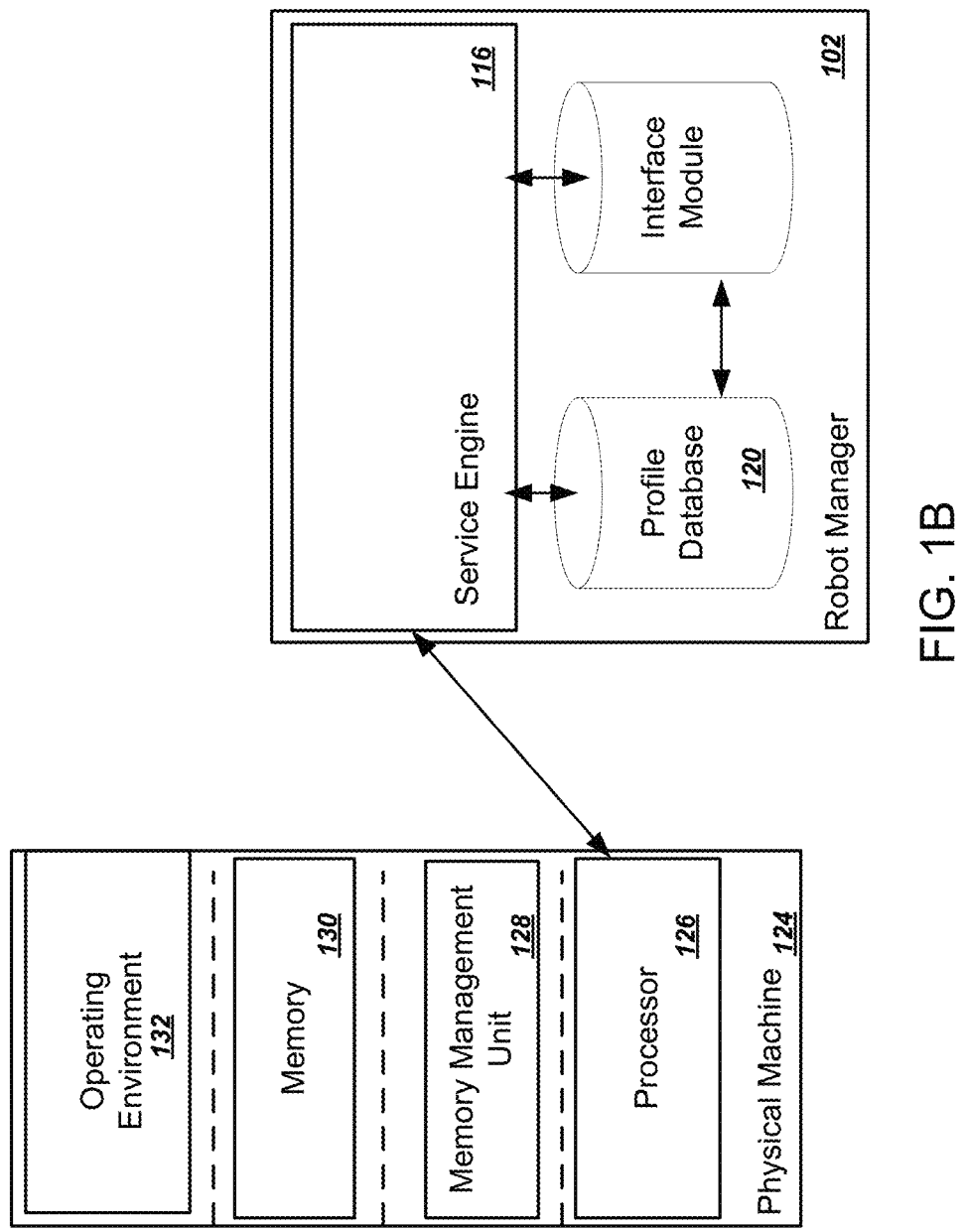
FIG. 1B shows an example computer system used to implement a robot manager.

FIG. 1B shows an example computer system used to implement a robot manager 102. The robot manager 102 executes on one or more physical machines, e.g., physical machine 124, that have an operating environment, e.g., operating environment 132. A physical machine includes physical hardware, for example, a processor (CPU) 126, a memory management unit (MMU) 128, and memory 130, e.g., Random Access Memory (RAM), hard disk, flash memory, or a combination of these. An operating environment is a set of configurations, software applications, operating system, and other aspects of a software framework.

The robot manager 102 maintains a profile database 120 that includes multiple robot and user profiles. The robot manager 102 uses the profile database 120 to store and maintain information about each robot, e.g., robots 104-108, in a robot profile and each user, e.g., users 110-114. The profile database 120 creates a robot profile for a robot based on registration information from a robot. The registration information of a robot can include a unique identifier, a network identifier, and information describing the capabilities of the robot. Additionally, the registration information can include performance data of the robot, communication and security information, and qualification information. Communication information includes the network protocol used to communicate with other robots. Types of network protocols include, for example, Transmission Control Protocol/Internet Protocol (TCP/IP) and secure socket layer (SSL). Security information includes key authentication information. Qualification information includes authorization information that allows a robot to join the robot management system 100. A robot that joins the robot management system 100 is qualified. The robot profile includes a schedule of availability of the particular robot, tasks assigned to the particular robot, and capabilities of the particular robot. The robot profile is described in more detail below in reference to FIGS. 2A-2B.

The profile database 120 stores and maintains information about each user, e.g., users 110-114, including login credentials, associations between the user and robots tasked, and associations between the user and robots owned. A user is a user of the robot management system 100. The user can be an owner of a registered robot or can be an individual qualified to use the robot management system 100 to perform service requests. The profile database 120 can, for example, store and maintain an association between a user, "John Doe," and a tasked robot, "Robot ABC," that indicates that "John Doe" has scheduled "Robot ABC" to perform task X. The association between the user and tasked robot can include information describing the task. The information that describes the task can include a time to execute the task. For example, "Robot ABC" can be tasked to perform task X on "Jul. 11, 2015 at 20:00 GMT." In other implementations, the execution time of the task is event-driven. For example, the system can assign "Robot ABC" to perform task X in response to receiving a notification from "Robot DEF." The associations between the user and robots owned includes information that describes the ownership of the robot. For example, "John Doe" can own "Robot DEF."

The robot manager 102 includes a service engine 116 that receives service requests from users on multiple user devices across a data communication network 122. The data communication network 122, e.g., a local area network (LAN) or wide area network (WAN), e.g., the Internet, or a combination of networks, connects the users 110-114 and robots 104-108 with the robot manager 102.

Generally, a service request includes instructions relating to one or more tasks for one or more robots. For example, the service request can be a request to clean a user's clothes. The instructions relating to one or more tasks, for example, to clean a user's clothes can include sending a robot to pick up the user's clothes and delivering the clothes to a particular location, washing the clothes, ironing the clothes, folding the clothes, and delivering the clothes back to the user's residence. As another example, the service request can be a request to register a robot to the robot management system. As another example, the service request can be a request to link a registered robot to another robot in the system. As another example, the service request can be a request to monitor or analyze the performance of a registered robot. As another example, the service request can be a request to transfer relevant data. Relevant data can include, for example, situational awareness information, health and performance data, and decision analysis information, from the community of users and registered robots to one or more selected registered robots. The service request can include additional information. The additional information can be constraint information or task information. Constraint information can include information describing temporal constraints or physical constraints. Temporal constraints can restrict performance of the task to a specific time or window of time. Physical constraints can specify external restrictions that affect performance of the service request, such as weather, traffic, legal regulations, or other restraints that restrict physical performance of the service request.

The service engine 116 receives the service request and identifies one or more tasks based on the service request. The service request can include task information that identifies the tasks associated with the service request. The service engine 116 can provide an interface, e.g., a webpage, to the user where the user inputs task information to include in the service request. In some implementations, the robot manager system stores associations between service requests and tasks in a database and uses the database to identify tasks associated with a service request.

The service engine 116 can perform the service request by selecting one or more registered robots to perform identified tasks. The process of executing the service request is described in more detail below in reference to FIG. 3.

The service engine 116 can store and collect operational data from the registered robots. The service engine can determine relevant data for a particular robot based on the robot profile of the particular robot and the collected operational data, and provide that data to a particular robot. The process of gathering and sharing community information is described in more detail below in reference to FIG. 4.

The robot manager 102 includes an interface module 118. The interface module 118 provides a user interface for users of the system and an application programming interface (API) for registered robots of the system. The service engine 116 (through the interface module 118) provides a user interface to the user to receive service requests. The user interface can be, for example, a webpage or a command line, and include user interface elements, such as links, radio buttons, query boxes, or menus. The interface module 118 can cause the user interface to display on a computing device, e.g., a tablet, computer, or a smartphone. Then, the user interface can receive from the user the service request including task information associated with the service request. In some implementations, the service engine 116 through the interface module 118 prompts the user to identify tasks associated with a service request, and upon completion of a service request, receives a rating for the robot that performed the task from the user or robot requesting the service.

Figure 2A:
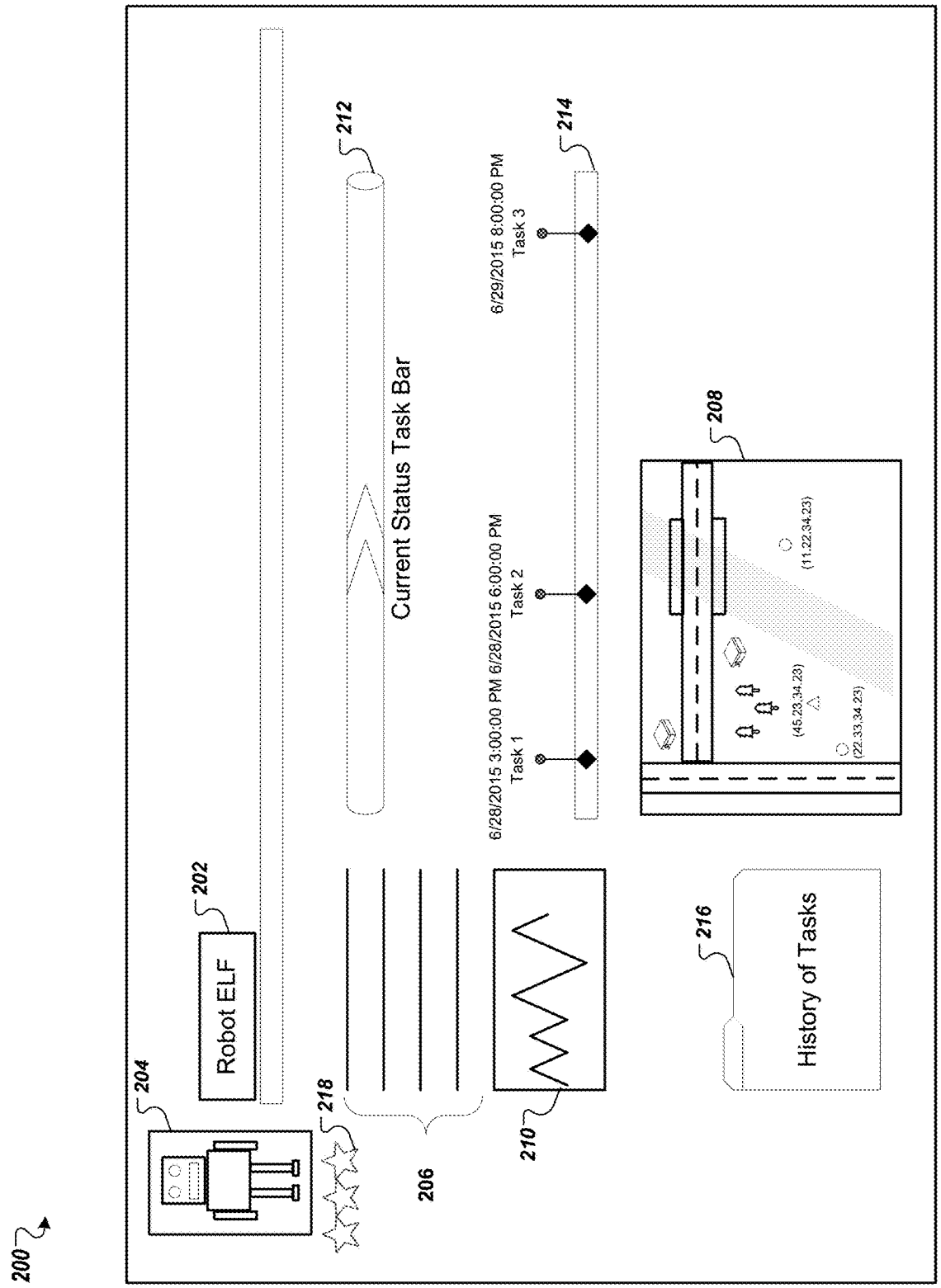
FIGS. 2A-2B show an example robot profile.
Figure 2B:
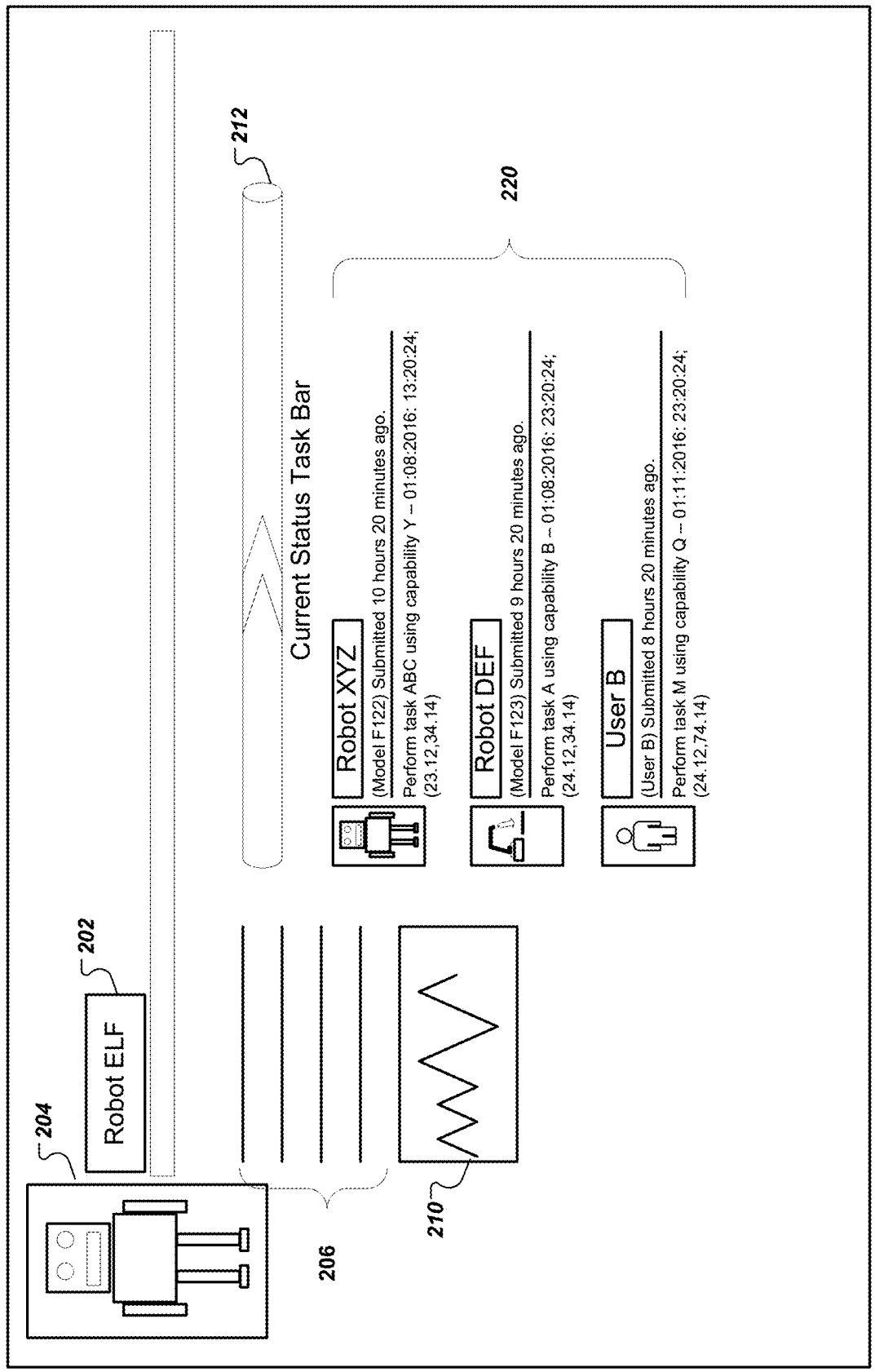

FIGS. 2A-2B show an example robot profile 200. The robot profile 200 of a robot can include a unique identifier 202, model information, and an icon 204 that are associated with the particular robot. The icon can depict the physical features of the robot. Physical features can include, for example, wheels, legs, or a stationary base. The robot profile can include rating information 218. The system can receive rating information that describes the performance of the particular robot that performed the task. The robot profile 200 can include a list of capabilities 206. For example, capabilities can include the ability to deliver a package, scan 3D objects, cook food, drive a vehicle, or operate another device, such as an energy beam, a writing instrument, or other electronic or mechanical device. The robot profile can provide health information 210 and location information 208.

Health information 210 includes information related to the maintenance and operation of the particular robot. For example, the information can include results of a self-diagnostic that describes the overall functionality of the robot. The self-diagnostic can include software and hardware tests. Hardware tests can include tests on any processors, sensors, memory, or other physical components of the particular robot. Software tests can include software code tests on memory buffers, virtual memory, and other computing resources. Health information can include information describing scheduled maintenance downtime, current power levels, time (both waiting and while performing tasks) till a recharge is needed, and current operational lifecycle information.

Location information 208 includes information describing the surrounding environment. For example, the surrounding environment can be a network environment or a physical environment. Location information can include both present location information and historical location information. Present location information includes the location information of the particular robot and other registered robots within a threshold distance of the particular robot. The system can identify geographical locations for the particular robot and other nearby robots using sensors on the particular robot, e.g., GPS device, or surrounding wireless or cellular networks, and display the information in a map layout in the robot profile 200. Historical location information can include the path that the robot travelled over a period of time. For example, the map layout can show the path the particular robot travelled in the past 30 minutes. The map layout can show the path the particular robot is scheduled to travel in a particular timeframe based on the scheduled tasks.

The robot profile 200 includes status of tasks, workflow information, and performance information. The status 212 can show the completion percentage of the current task and information describing the current task. The robot profile 200 includes a workflow schedule 214. The workflow schedule 214 includes information describing the scheduled tasks. The information can include a description describing the task and an execution time. The robot profile can identify areas in the workflow schedule 214 where a scheduled task is behind schedule. For example, if "Robot ELF" requires that "Robot ABC" perform Task C before "Robot ELF" performs Task 2, and Task C is delayed by 5 minutes, then "Robot ELF" can update the workflow schedule 214 to account for the delay in the completion of Task C. Performance information can include a history of tasks 216 that were completed or assigned. Task information can include a streaming storyline 220 of received tasks. The streaming storyline can include a summary. The summary provides information including the identifier of the registered robot or user that submitted the task, a date and timestamp of when the task was received, information describing the task and the capability required to perform the task, a location that indicates where to perform the task, and execution time.

Figure 3:
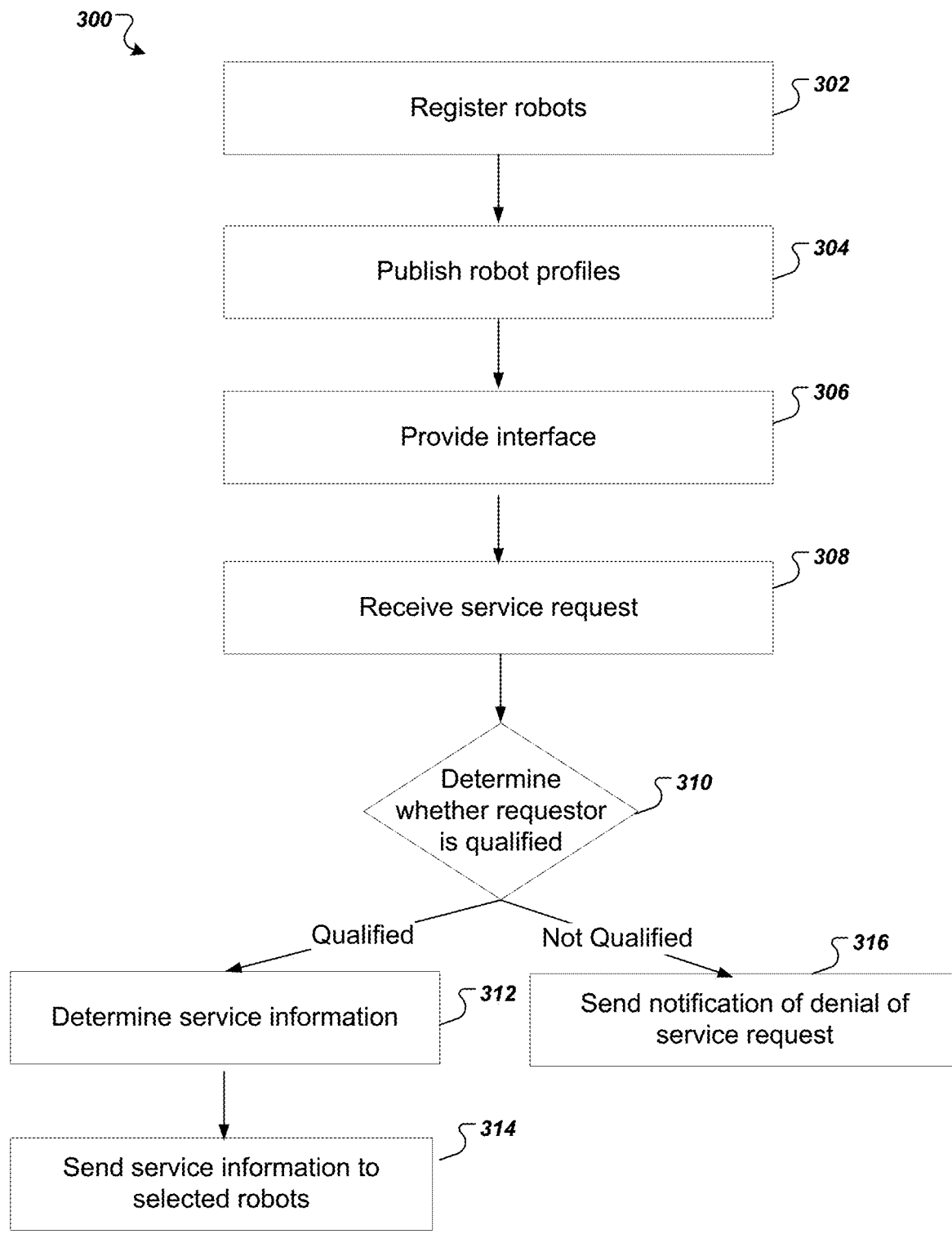
FIG. 3 is a flow diagram of an example process for executing a service request.

FIG. 3 is a flow diagram of an example process 300 for executing a service request. The process 300 is performed by a system of one or more computers. For example, a robot manager 102 of FIGS. 1A and 1B, appropriately programmed, can perform the process 300.

The system registers robots to include in the system at 302. Registration can include discovering an unregistered robot, authorizing the unregistered robot to join the system, and linking the unregistered robot to the system. The system can discover robots passively by permitting robots to discover the system or actively by interrogating robots within a threshold distance from the system. Passive discovery of robots can include setting the system to a discovery mode, receiving a request to join the system, sending a request for registration information to the unregistered robot, receiving registration information from the unregistered robot, and permitting the unregistered robot to join the system. Active interrogation of robots can include discovering robots or owners of unregistered robots, sending an invitation that includes a request to provide registration information to the discovered robots, and receiving a response that indicates acceptance of the invitation from the discovered robots.

The registration information from the unregistered robots can include identification information, e.g., a unique identifier or a network identifier, for the robot, communication information, and security information to assist in communicating in the system. The system can create a robot profile for robots that join the system based on the registration information.

The system can register users to the system. Registration of users includes causing a presentation of a display to the user on the user device that requests user information including login credentials, receiving login credentials for the user, and creating a user profile in the profile database based on the received login credentials.

The system publishes the robot profile of each registered robot to enable discovery of each registered robot by other registered robots in the system or by users of the system at 304. The system publishes the robot profiles by sharing the robot profiles with other registered robots or users of the system. In some implementations, the system publishes the robot profiles to a centralized server where all the registered robots have access, e.g., on a bulletin board. In other implementations, the system shares the robot profiles with the other registered robots without publishing the profile in a centralized location.

The system provides an application programming interface (API) to the registered robots and a user interface to the users of the system at 306. The users of the system include owners of the registered robots. The user interface can include user interface elements, e.g., query box, radio button, or user menus, to receive from the user the service request including task information associated with the service request. For example, the system can receive from the user a list of tasks associated with the service request. The user can input the list of tasks by selecting the tasks from a menu.

The system receives a service request at 308. The service request can include information describing one or more tasks that, when performed, collectively result in the completion of the service request. In other implementations, the system stores known associations between service requests and required tasks. The system can receive and store pre-determined associations between service requests and required tasks in a database in the system. The system can determine (using the database) tasks associated with a received service request. The system can identify tasks associated with a service request based on previous service requests that are of the same category and that included task information. For example, if the system receives a first service request to build a piece of furniture, and the first service request specifies the tasks associated with building a piece of furniture, the service engine can store those tasks in a database and associate the tasks to the first service request. The tasks to build a piece of furniture can include purchasing the material, following assembly instructions, and checking the furniture for defects. When the system receives a subsequent service request that does not include task information and is of the same category as a previous service request, the system can use the tasks associated with the previous service request to identify the tasks associated with the subsequent service request. For example, if the system receives a subsequent service request to build a chair, but the service request does not include task information, the system can determine that the tasks are purchasing material for the furniture, assembling the furniture using instructions, and checking the chair for defects based on the task information received from the first service request.

The system then determines whether a requestor is qualified at 310. The requestor is the user or robot submitting the service request. The user of the system is qualified when the user is authorized to access the system and authorized to request the particular service. A robot is qualified when the robot is registered with the system and is authorized to request the particular service. The system can, for example, restrict the number of service requests that the system processes for the user or the robot. Moreover, the system can restrict the type of service requests that it processes for the user or robot. For example, the system can specify that "Robot ELF" can only make service requests to deliver packages. Additionally, the system can restrict access to registered robots or capabilities on particular registered robots. For example, the system can specify that "John Doe" does not have access to "Robot ABC" or to capability X on "Robot DEF."

In response to determining that the requestor is qualified, the system determines the service information to send to the registered robots at 312. The service information is based on the service request and the published robot profiles. The service information includes the tasks associated with the service request and data describing the capabilities needed to perform the specific tasks. For example, the system can send the following service information in response to a service request to deliver a package: hours of operation and location of the shipper, hours of operation and location for the delivery location, location information for other robots, and travel speed. The system analyzes the capabilities available in the community of registered robots and any constraints indicated in the service request or identified by the registered robots, e.g., a time constraint, physical constraint, or other availability constraint, to include in the service information.

For example, a service request can be a request to ship a package from a warehouse in California to a buyer in the District of Columbia, and the system can determine that a first robot drone has to fly a package from California to Colorado and transfer the package to a second robot drone because the first robot drone does not have sufficient fuel to fly to the District of Columbia. The service information to the first robot can include travel speed information, location of the second robot drone, and surrounding flight information that can be provided by other robots in the community. Then, the system can determine that the second robot drone must transfer the package to a third robot drone that drives the package to the purchaser when the second robot drone reaches Ohio because no drones are permitted to fly in restricted airspace that surrounds the District of Columbia. The service information to the second robot can include flight restriction and airspace information, and the service information to the third robot can include the destination location.

In another example, a service request can be a request to assemble heavy machinery. The system can determine that a first robot has to order a part that is unavailable. The service information can include inventory information including the number of available parts for each part that makes up the machinery. The system can then determine that a second robot can proceed with assembly when the part is received. The service information can include, for example, assembly instructions. Finally, the system can have a third robot check the assembled machinery to ensure the machinery is assembled correctly after the second robot is finished. The service information to the third robot can include, for example, quality control information.

The system can identify the constraints based on the collective operational data of the registered robots. For example, operational data gathered from the registered robots can indicate that in 3 hours a snowstorm will make Robot XYZ unavailable or that a scheduled maintenance shutdown will make Robot ABC unable to access a computer server. Constraints can include resource constraints. For example, Robot ABC will have no hardware and software resource to perform processing capabilities to find a path through a remote region or traffic based on available satellite data because the resources are being used to process range scan data for the region to form a 3D model which is then made available to other robots or users.

Once the system determines the service information to send, the system selects the one or more registered robots to execute the service request using the service information and published robot profiles, and sends the service information to the selected registered robots at 314. The system selects the one or more registered robots by matching the capabilities, location, and performance information including rating information of the registered robots to the service information. In particular, the system assigns the tasks associated with the service request among the one or more selected registered robots using the robot profile. That is, the system identifies a particular registered robot to perform a particular task associated with the service request based on the capabilities of the particular registered robot, the particular robot's availability, and current workflow of tasks. The system schedules a particular registered robot to perform a particular task by updating the robot profile of the particular registered robot and communicating the task and execution time of the particular task of the particular registered robot.

The system then sends the service information to the selected registered robot. The system can send the service information across a data communication network. Example data communication networks include, for example, the internet, wireless networks, and cellular networks. In some implementations, the system receives an indication from the one or more selected registered robots that the tasks were completed, and the system can provide an indication to the requestor that the service request was performed when all tasks are completed.

If the robot or user is not qualified, the system can send a notification or indication to the user or robot and deny service at 316. For example, the system can provide for display on the user device a prompt or dialog box that informs the user that the user is not qualified.

Figure 4:
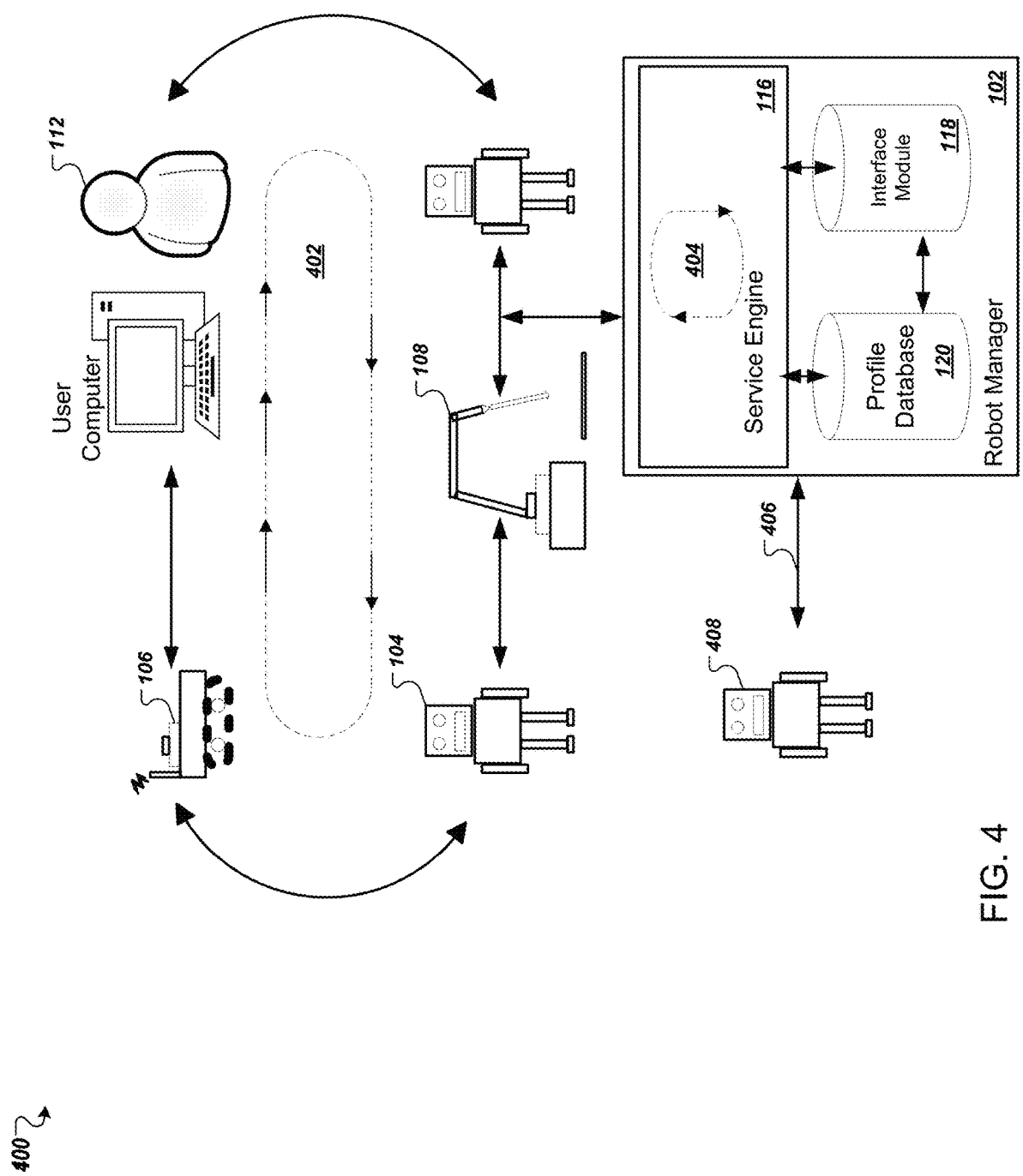
FIG. 4 shows an example process for gathering and sharing community information.

FIG. 4 shows an example process 400 for gathering and sharing community information. The process 400 is performed by a system of one or more computers. For example, a robot manager 102, appropriately programmed, can perform the process 400.

The system collects operational data from each registered robot, e.g., robots 104-108 in the system 408 at 402 and any users that are part of the system, e.g., user 112. The collected operational data can include environmental information, data related to performance and results of performed tasks, status information, health information, and currently assigned tasks from each of the registered robots.

The system evaluates the collected operational data at 404. The evaluation of the collected operational data can include performing statistical analysis on the collected data. For example, based on the operational data the system can extrapolate future occurrences or perform decision analysis. Statistical analysis can include determining probabilities that an event or outcome will occur. The system can apply a greater weight to more recent operational data in determining and extrapolating events or outcomes. For example, the system can gather and collect situational awareness information, e.g., traffic data, from each of the registered robots in different locations and can determine traffic patterns and movements based on the gathered traffic data. The system can give greater weight to the most recent traffic data. In reference to the example of delivering a package above, operational data that is collected can include traffic pattern data from robots located near a destination location and along the path being travelled. The evaluated data can include path information and traffic flow information that is determined using the collected operational data.

When the system receives a service request to transfer relevant data to one of the selected registered robots, the system determines the relevant data from the evaluated collected operational data based on the service request. The service request can include data describing the relevant data. For example, the data can include the anticipated traffic flow information at a particular time during the day and for a particular location or path for a robot that performs package delivery.

In response to the service request to transfer relevant data, the system sends the relevant data to the selected robot at 406. For example, the system can receive a service request, from robot 408, another robot, or a user, to transfer relevant data to robot 408. The service request can specify data or type of data that is relevant. In some implementations, the system can determine the relevant data for robot 408 based on the profile of robot 408, profiles of other similar robots in the system, and the collected operational data. A robot is similar to another robot, for example, if it has the same capabilities as another robot. For example, the system can consider a first robot that functions as a wireless network router and relays data traffic to other robots similar to a second robot that functions as a cellular relay for multiple user devices. The system can then identify based on the profile of the first robot, that certain types of information, e.g., routing information, communication protocols, and latency measurements, are relevant to the second robot. Once the data is identified, the system provides the relevant data to the robot 408. The system can, for example, download the relevant data into robot 408, or the system can provide robot 408 access to the relevant data.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this document, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a client device, e.g., for purposes of displaying data to and receiving user input from a user interacting with the client device. Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method comprising:
   registering a plurality of robots in a system including creating for each robot of the plurality of robots a robot profile;
   publishing the robot profile of each registered robot of the plurality of registered robots to enable discovery of each registered robot by other registered robots in the system or by users of the system including owners of registered robots in the system;
   collecting operational data related to performance of tasks, the operational data comprising situational awareness information from at least a first of the plurality of registered robots;
   evaluating the collected operational data including performing statistical analysis, modeling, and extrapolation using the collected operational data;
   receiving, from a requestor, a request to transfer relevant data to at least a second of the plurality of registered robots, wherein the at least a second registered robot is selected based on at least the robot profile published for the second registered robot, and the requestor is a requesting user or a requesting robot;
   determining that the requestor is qualified, wherein the requesting user is qualified when the requesting user is authorized to access the system and authorized to make the request, and the requesting robot is qualified when the requesting robot is registered with the system and authorized to make the request; and
   in response to determining that the requestor is qualified,
      determining relevant data from the evaluated collected operational data, the relevant data including at least a portion of the situational awareness information, and
      sending the relevant data to at least the second registered robot.

2. The computer implemented method of claim 1, wherein the situational awareness information comprises a three dimensional model formed from range scan data.

3. The computer implemented method of claim 1, wherein the collecting comprises collecting status information, health information, and currently assigned tasks from each of the plurality of registered robots.

4. The computer implemented method of claim 1, wherein the plurality of registered robots perform the collecting, the evaluating, the receiving, the determining that the requestor is qualified, the determining relevant data from the evaluated collected operational data, and the sending.

5. The computer implemented method of claim 1, wherein the robot profile for each registered robot includes capabilities of the registered robot, a location of the registered robot, performance ratings of the registered robot for specified tasks, and a workflow schedule for the registered robot, the workflow schedule describing each scheduled task and an execution time for when the registered robot will perform the scheduled task; and wherein the method further comprises:
   receiving a service request from the requestor or another requestor being a requesting user or a requesting robot;
   determining that the requestor or the other requestor is qualified, wherein the requesting user is qualified when the requesting user is authorized to access the system and authorized to make the service request, and the requesting robot is qualified when the requesting robot is registered with the system and authorized to make the service request;
   in response to determining that the requestor or the other requestor is qualified,
      determining a plurality of tasks associated with the service request, and
      assigning the plurality of tasks among two or more registered robots selected from the plurality of registered robots based on the published robot profiles, the assigning comprising matching capabilities, location and performance information for each robot, and determining when each task of the plurality of tasks is to be performed in a workflow of each of the two or more registered robots at a time defined by the workflow schedule of each of the two or more registered robots; and
sending service information to the two or more registered robots, the service information including the plurality of tasks assigned among the two or more registered robots.

6. The computer implemented method of claim 5, wherein the service information includes temporal constraints, physical constraints, or both temporal constraints and physical constraints.

7. The computer implemented method of claim 5, wherein the service information includes information describing the plurality of tasks assigned to the two or more selected registered robots including information to coordinate activities of the two or more selected registered robots in performing the plurality of tasks.

8. A non-transitory computer storage medium encoding one or more modules of computer program instructions operable to cause data processing apparatus to perform operations comprising:
registering a plurality of robots in a system including creating for each robot of the plurality of robots a robot profile;
publishing the robot profile of each registered robot of the plurality of registered robots to enable discovery of each registered robot by other registered robots in the system or by users of the system including owners of registered robots in the system;
collecting operational data related to performance of tasks, the operational data comprising situational awareness information from at least a first of the plurality of registered robots;
evaluating the collected operational data including performing statistical analysis, modeling, and extrapolation using the collected operational data;
receiving, from a requestor, a request to transfer relevant data to at least a second of the plurality of registered robots, wherein the at least a second registered robot is selected based on at least the robot profile published for the second registered robot, and the requestor is a requesting user or a requesting robot;
determining that the requestor is qualified, wherein the requesting user is qualified when the requesting user is authorized to access the system and authorized to make the request, and the requesting robot is qualified when the requesting robot is registered with the system and authorized to make the request; and
in response to determining that the requestor is qualified,
determining relevant data from the evaluated collected operational data, the relevant data including at least a portion of the situational awareness information, and
sending the relevant data to at least the second registered robot.

9. The non-transitory computer storage medium of claim 8, wherein the situational awareness information comprises a three dimensional model formed from range scan data.

10. The non-transitory computer storage medium of claim 8, wherein the collecting comprises collecting status information, health information, and currently assigned tasks from each of the plurality of registered robots.

11. The non-transitory computer storage medium of claim 8, wherein the plurality of registered robots perform the collecting, the evaluating, the receiving, the determining that the requestor is qualified, the determining relevant data from the evaluated collected operational data, and the sending.

12. The non-transitory computer storage medium of claim 8, wherein the robot profile for each registered robot includes capabilities of the registered robot, a location of the registered robot, performance ratings of the registered robot for specified tasks, and a workflow schedule for the registered robot, the workflow schedule describing each scheduled task and an execution time for when the registered robot will perform the scheduled task; and wherein the operations further comprise:
receiving a service request from the requestor or another requestor being a requesting user or a requesting robot;
determining that the requestor or the other requestor is qualified, wherein the requesting user is qualified when the requesting user is authorized to access the system and authorized to make the service request, and the requesting robot is qualified when the requesting robot is registered with the system and authorized to make the service request;
in response to determining that the requestor or the other requestor is qualified,
determining a plurality of tasks associated with the service request, and
assigning the plurality of tasks among two or more registered robots selected from the plurality of registered robots based on the published robot profiles, the assigning comprising matching capabilities, location and performance information for each robot, and determining when each task of the plurality of tasks is to be performed in a workflow of each of the two or more registered robots at a time defined by the workflow schedule of each of the two or more registered robots; and
sending service information to the two or more registered robots, the service information including the plurality of tasks assigned among the two or more registered robots.

13. The non-transitory computer storage medium of claim 12, wherein the service information includes temporal constraints, physical constraints, or both temporal constraints and physical constraints.

14. The non-transitory computer storage medium of claim 12, wherein the service information includes information describing the plurality of tasks assigned to the two or more selected registered robots including information to coordinate activities of the two or more selected registered robots in performing the plurality of tasks.

15. A system comprising:
a plurality of registered robots, each registered robot of the plurality of registered robots having a robot profile that is published to enable discovery by other registered robots in the system or by users of the system; and
one or more computers and one or more storage devices storing instructions that are operable, when executed by the one or more computers, to cause the one or more computers to perform operations comprising:
collecting operational data related to performance of tasks, the operational data comprising situational awareness information from at least a first of the plurality of registered robots;
evaluating the collected operational data including performing statistical analysis, modeling, and extrapolation using the collected operational data;
receiving, from a requestor, a request to transfer relevant data to at least a second of the plurality of registered robots, wherein the at least a second registered robot is selected based on at least the robot profile published for the second registered robot, and the requestor is a requesting user or a requesting robot;

determining that the requestor is qualified, wherein the requesting user is qualified when the requesting user is authorized to access the system and authorized to make the request, and the requesting robot is qualified when the requesting robot is registered with the system and authorized to make the request; and in response to determining that the requestor is qualified, determining relevant data from the evaluated collected operational data, the relevant data including at least a portion of the situational awareness information, and sending the relevant data to at least the second registered robot.

16. The system of claim 15, wherein the situational awareness information comprises a three dimensional model formed from range scan data.

17. The system of claim 15, wherein the collecting comprises collecting status information, health information, and currently assigned tasks from each of the plurality of registered robots.

18. The system of claim 15, wherein the plurality of registered robots comprises the one or more computers, and the operations are performed by the plurality of registered robots.

19. The system of claim 15, wherein the robot profile for each registered robot includes capabilities of the registered robot, a location of the registered robot, performance ratings of the registered robot for specified tasks, and a workflow schedule for the registered robot, the workflow schedule describing each scheduled task and an execution time for when the registered robot will perform the scheduled task; and wherein the operations further comprise:

receiving a service request from the requestor or another requestor being a requesting user or a requesting robot;

determining that the requestor or the other requestor is qualified, wherein the requesting user is qualified when the requesting user is authorized to access the system and authorized to make the service request, and the requesting robot is qualified when the requesting robot is registered with the system and authorized to make the service request;

in response to determining that the requestor or the other requestor is qualified, determining a plurality of tasks associated with the service request, and assigning the plurality of tasks among two or more registered robots selected from the plurality of registered robots based on the published robot profiles, the assigning comprising matching capabilities, location and performance information for each robot, and determining when each task of the plurality of tasks is to be performed in a workflow of each of the two or more registered robots at a time defined by the workflow schedule of each of the two or more registered robots; and sending service information to the two or more registered robots, the service information including the plurality of tasks assigned among the two or more registered robots.

20. The system of claim 19, wherein the service information includes temporal constraints, physical constraints, or both temporal constraints and physical constraints.

21. The system of claim 19, wherein the service information includes information describing the plurality of tasks assigned to the two or more selected registered robots including information to coordinate activities of the two or more selected registered robots in performing the plurality of tasks.

* * * * *